(12) United States Patent
Wu

(10) Patent No.: US 12,520,262 B2
(45) Date of Patent: Jan. 6, 2026

(54) METHOD FOR TRANSMISSION TIMING DETERMINATION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 400 days.

(21) Appl. No.: 18/062,530

(22) Filed: Dec. 6, 2022

(65) Prior Publication Data

US 2023/0095079 A1 Mar. 30, 2023

Related U.S. Application Data

(63) Continuation of application No. PCT/CN2020/097266, filed on Jun. 19, 2020.

(51) Int. Cl.
*H04W 72/0446* (2023.01)
*H04W 56/00* (2009.01)
*H04W 72/20* (2023.01)

(52) U.S. Cl.
CPC ....... *H04W 56/0045* (2013.01); *H04W 72/20* (2023.01)

(58) Field of Classification Search
CPC ............. H04W 56/0045; H04W 72/20; H04W 72/0446; H04B 7/18563
USPC ........................................................ 370/350
See application file for complete search history.

(56) References Cited

U.S. PATENT DOCUMENTS

| | | | |
|---|---|---|---|
| 2014/0010218 A1 | 1/2014 | Persson et al. | |
| 2016/0227505 A1 | 8/2016 | Loehr et al. | |
| 2019/0159156 A1 | 5/2019 | Abedini et al. | |
| 2019/0215048 A1 | 7/2019 | Cirik et al. | |
| 2019/0260517 A1* | 8/2019 | Liu | H04L 1/1812 |
| 2019/0320343 A1* | 10/2019 | Wang | H04W 28/0268 |
| 2019/0342845 A1 | 11/2019 | Laselva et al. | |
| 2020/0028768 A1 | 1/2020 | Sadiq et al. | |
| 2020/0053637 A1* | 2/2020 | Tsai | H04W 48/16 |
| 2020/0068518 A1* | 2/2020 | Xie | H04W 24/10 |

(Continued)

FOREIGN PATENT DOCUMENTS

| | | |
|---|---|---|
| CN | 107872301 | 4/2018 |
| CN | 109788548 | 5/2019 |

(Continued)

OTHER PUBLICATIONS

EPO, Communication for EP Application No. 20941324.4, Mar. 4, 2024.

(Continued)

*Primary Examiner* — Ayman A Abaza
*Assistant Examiner* — Tracy L Williams
(74) *Attorney, Agent, or Firm* — Hodgson Russ LLP

(57) ABSTRACT

Embodiments of the disclosure provide a method for wireless communication, a terminal device, and a network device. The method includes the following. A terminal device obtains first indication information. The terminal device transmits the first indication information to a network device, where the first indication information is used to determine a first transmission timing.

14 Claims, 4 Drawing Sheets

(56) References Cited

U.S. PATENT DOCUMENTS

| | | | |
|---|---|---|---|
| 2020/0107348 A1 | 4/2020 | Park et al. | |
| 2020/0146054 A1 | 5/2020 | Jeon et al. | |
| 2022/0361251 A1* | 11/2022 | Yu | H04W 56/0045 |

FOREIGN PATENT DOCUMENTS

| | | |
|---|---|---|
| CN | 110838898 | 2/2020 |
| CN | 110876188 | 3/2020 |
| WO | 2019139962 | 7/2019 |
| WO | 2020041757 | 2/2020 |

OTHER PUBLICATIONS

EPO, Communication for EP Application No. 20941324.4, Jul. 12, 2024.

CNIPA, First Office Action for CN Application No. 202310232576.X, May 31, 2024.

CNIPA, Second Office Action for CN Application No. 202310232576.X, Aug. 7, 2024.

EPO, Extended European Search Report for EP Application No. 20941324.4, Jun. 16, 2023.

EPO, Communication for EP Application No. 20941324.4, Feb. 7, 2025.

Zte, "Discussion on the enhancement of NTN," 3GPP TSG RAN WG1 #101, R1-2003560, May 2020.

"3rd Generation Partnership Project; Technical Specification Group Radio Access Network; Solutions for NR to support hon-terrestrial networks (NTN)," 3GPP TR 38.821, Dec. 2019, v16.0.0.

Zte et al., "Report of Email Discussion [107#60] [NR/NTN] RACH capacity evaluation and procedures, " 3GPP TSG-RAN WG2 Meeting #107bis, R2-1912664, Oct. 2019.

WIPO, International Search Report and Written Opinion for International Application No. PCT/CN2020/097266, Mar. 1, 2021.

EPO, Communication for EP Application No. 20941324.4, Jul. 10, 2025.

* cited by examiner

METHOD FOR TRANSMISSION TIMING DETERMINATION, TERMINAL DEVICE, AND NETWORK DEVICE

CROSS REFERENCE TO RELATED APPLICATION(S)

This application is a continuation of International Application No. PCT/CN2020/097266, filed Jun. 19, 2020, the entire disclosure of which is incorporated herein by reference.

TECHNICAL FIELD

Embodiments of the disclosure relate to the field of communication, and more particularly, to a method for wireless communication, a terminal device, and a network device.

BACKGROUND

In a terrestrial communication system, a propagation delay of signal communication is usually less than 1 millisecond (ms). In a non-terrestrial network (NTN) system, due to the long communication distance between a terminal device and a satellite (or a network device), the propagation delay of signal communication is quite large and may range from dozens of milliseconds to hundreds of milliseconds, depending on the altitude of the satellite orbit and the service type of satellite communication. To deal with the large propagation delay, a timing relationship, i.e., an uplink (UL) transmission timing of the NTN system needs to be enhanced with respect to a new radio (NR) system. In the NTN system, how to determine a transmission timing is a technical problem to be solved in the disclosure.

SUMMARY

In a first aspect, a method for wireless communication is provided. The method includes the following. A terminal device obtains first indication information. The terminal device transmits the first indication information to a network device. The first indication information is used to determine a first transmission timing.

In a second aspect, a terminal device is provided. The terminal device includes a transceiver, a memory configured to store computer programs, and a processor configured to invoke and execute the computer programs stored in the memory to: obtain first indication information, and cause the transceiver to transmit the first indication information to a network device, where the first indication information is used to determine a first transmission timing.

In a third aspect, a network device is provided. The network device includes a transceiver, a memory configured to store computer programs, and a processor configured to invoke and execute the computer programs stored in the memory to: cause the transceiver to receive first indication information, where the first indication information is used to determine a first transmission timing.

DETAILED DESCRIPTION

Figure 1A:
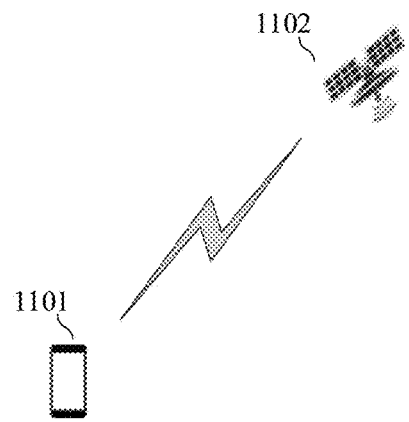
FIGS. 1A and 1B are schematic diagrams of an architecture of a communication system provided in embodiments of the disclosure.

The following will describe technical solutions of embodiments of the disclosure with reference to the accompanying drawings. Apparently, embodiments described herein are merely some embodiments, rather than all embodiments, of the disclosure. For embodiments of the disclosure, all other embodiments obtained by those of ordinary skill in the art without creative effort shall fall within the protection scope of the disclosure.

The technical solutions of embodiments of the disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area networks (WLAN), a wireless fidelity (WiFi), a 5th-generation (5G) communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication. Embodiments of the disclosure are also applicable to these communication systems.

Optionally, a communication system of embodiments of the disclosure is applicable to a carrier aggregation (CA) scenario, a dual connectivity (DC) scenario, or a standalone (SA) network deployment scenario.

Optionally, embodiments of the disclosure are applicable to an unlicensed spectrum, and are also applicable to a licensed spectrum. The unlicensed spectrum can also be considered as a shared spectrum, and the licensed spectrum can be considered as an unshared spectrum.

Optionally, embodiments of the disclosure are applicable to a NTN system, and are also applicable to a terrestrial network (TN) system.

Embodiments of the disclosure are described with reference to a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, a user device, etc. The terminal device may be a station (STA) in a WLAN, or may be a cellular radio telephone, a cordless telephone, a session initiation protocol (SIP) telephone, a wireless local loop (WLL) station, a personal digital assistant (PDA) device, a handheld device with wireless communication functions, a computing device, other processing devices coupled with a wireless modem, an in-vehicle device, a wearable device, a terminal device in a next-generation communication system such as a NR network, a terminal device in a future evolved public land mobile network (PLMN), etc.

In embodiments of the disclosure, the terminal device may be deployed on land, for example, deployed indoors or outdoors, and may be handheld, wearable, or vehicle-mounted. The terminal device may also be deployed on water, for example, on a ship, etc. The terminal device may also be deployed in the air, for example, on an airplane, an air balloon, a satellite, etc.

In embodiments of the disclosure, the terminal device may be a mobile phone, a pad, a computer with a wireless transceiver function, a virtual reality (VR) terminal device, an augmented reality (AR) terminal device, a wireless terminal in industrial control, an in-vehicle terminal device, a wireless terminal in self driving, a wireless terminal device in remote medical, a wireless terminal device in smart grid, a wireless terminal device in transportation safety, a wireless terminal device in smart city, a wireless terminal in smart home, a wearable device, etc. The terminal device involved in embodiments of the disclosure may also be referred to as a terminal, a UE, an access terminal device, an in-vehicle terminal, an industrial control terminal, a UE unit, a UE station, a mobile station, and remote station, a remote terminal device, a mobile device, a UE terminal device, a wireless communication device, a UE agent, a UE device, etc. The terminal devices can be stationary or mobile.

By way of example rather than limitation, in embodiments of the disclosure, the terminal device may also be a wearable device. The wearable device may also be referred to as a wearable smart device, which is a generic term of wearable devices obtained through intelligentization designing and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

The network device may be a device configured to communicate with a mobile device. The network device may be an access point (AP) in the WLAN, a base transceiver station (BTS) in the GSM or CDMA, may also be a Node B (NB) in WCDMA, and may further be an evolutional Node B (eNB or eNodeB) in LTE, or a relay station or AP, or an in-vehicle device, a wearable device, a g-Node B (gNB) in the NR network, a network device in the future evolved PLMN, or the like.

The network device may be of mobility. For example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station located on land, water, etc.

In embodiments of the disclosure, the network device may provide services for a cell, and the terminal device communicates with the network device through a transmission resource (for example, a frequency domain resource or a spectrum resource) for the cell. The cell may be a cell corresponding to the network device (for example, a base station). The cell may correspond to a macro base station, and may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

Figure 1B:
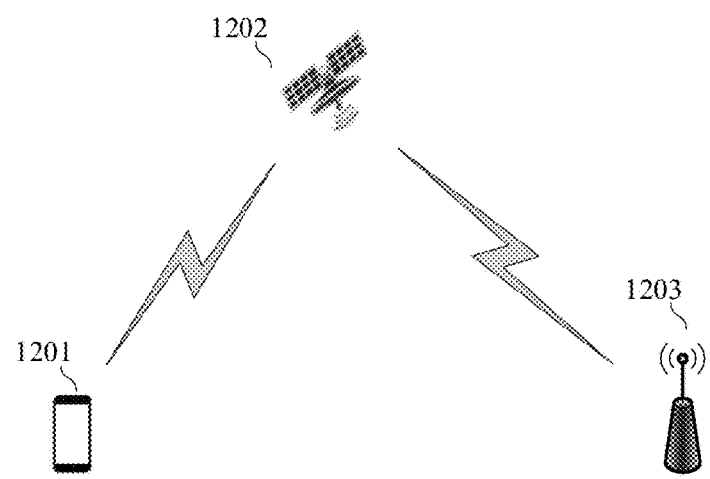

The following describes an architecture of a communication system in the disclosure with reference to FIGS. 1A and 1B.

FIG. 1A is a schematic diagram of an architecture of a communication system provided in embodiments of the disclosure. Referring to FIG. 1A, a terminal device 1101 and a satellite 1102 are included. The terminal device 1101 and the satellite 1102 can communicate wirelessly with each other. A network formed consisting of the terminal device 1101 and the satellite 1102 may also be referred to as an NTN. In the architecture of the communication system illustrated in FIG. 1A, the satellite 1102 can function as a base station, and the terminal device 1101 and the satellite 1102 can communicate directly with each other. In the system architecture, the satellite 1102 may be referred to as a network device. Optionally, there may be multiple network devices 1102 in the communication system, and there may be other numbers of terminal devices in the coverage of each network device 1102, which is not limited herein.

FIG. 1B is a schematic diagram of another architecture of a communication system provided in embodiments of the disclosure. Referring to FIG. 1B, a terminal device 1201, a satellite 1202, and a base station 1203 are included. The terminal device 1201 and the satellite 1202 can communicate wirelessly with each other, and the satellite 1202 and the base station 1203 can communicate with each other. A network formed consisting of the terminal device 1201, the satellite 1202, and the base station 1203 may also be referred to as an NTN. In the architecture of the communication system illustrated in FIG. 1B, the satellite 1202 may not function as a base station, and communication between the terminal device 1201 and the base station 1203 needs to be relayed via the satellite 1202. In such a system architecture, the base station 1203 may be referred to as a network device. Optionally, there may be multiple network devices 1203 in the communication system, and there may be other numbers of terminal devices in the coverage of each network device 1203, which is not limited herein.

It should be noted that, FIGS. 1A and 1B only illustrate a system to which the disclosure is applicable by way of example. Methods illustrated in embodiments of the disclosure are also applicable to other systems, such as a 5G communication system, an LTE communication system, etc., which is not specifically limited herein.

Optionally, the wireless communication system illustrated in FIGS. 1A and 1B may further include other network entities such as a mobility management entity (MME), an access and mobility management function (AMF), etc., which is not limited herein.

It should be understood that, the terms "system" and "network" herein are usually interchangeable. The term "and/or" herein is used to describe an association relationship between associated objects and represents that three relationships may exist. For example, A and/or B may represent the following three cases: only A exists, both A and B exist, and only B exists. The character "/" herein generally indicates an "or" relationship between the associated objects.

It should be understood that, the "indication" mentioned in embodiments of the disclosure may be a direct indication or an indirect indication, or indicate an association. For example, if A indicates B, it can mean that A directly indicates B, for example, B can be obtained through A, or mean that A indicates B indirectly, for example, A indicates C, and B can be obtained through C, or it can also mean that there is an association between A and B.

In the description of embodiments of the disclosure, the term "corresponding" can mean that there is a direct or indirect correspondence between two elements, or that there is an association between two elements, or that there is a relationship of "indicating" and "being indicated", "configuring" and "being configured", and the like.

Optionally, indication information in embodiments of the disclosure includes physical layer signaling, for example, at least one of downlink control information (DCI), radio resource control (RRC) signaling, and a media access control-control element (MAC CE).

Optionally, a higher layer parameter in embodiments of the disclosure includes at least one of RRC signaling and a MAC CE.

To clearly illustrate the idea of embodiments of the disclosure, related technical contents of embodiments of the disclosure are briefly described first. Embodiments of the disclosure include at least part of the following contents.

In an NTN system or other communication systems with large propagation delay, there may be two cases for a timing relationship between a terminal device and a network device.

Figure 2:
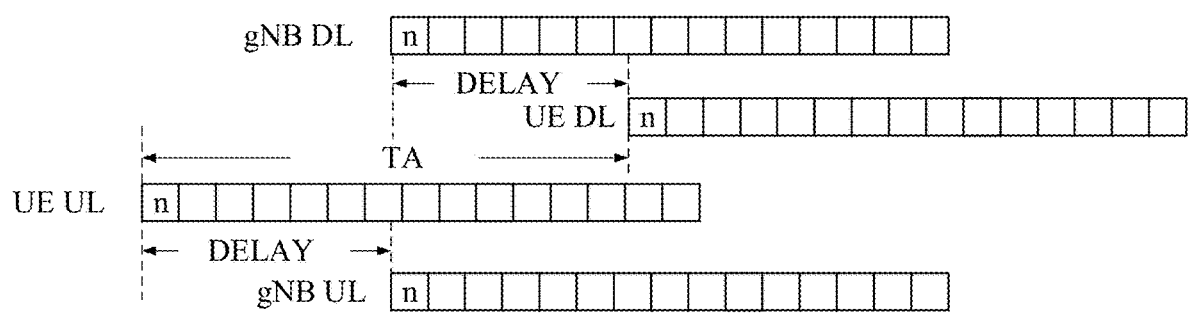
FIG. 2 is a schematic diagram of a timing relationship in an NTN system provided in embodiments of the disclosure.

Case 1: Referring to FIG. 2, a gNB downlink (DL) slot is aligned with a gNB uplink (UL) slot at base station side.

In this case, to align UL transmission of the UE at terminal side with the UL slot at base station side, the UE needs to transmit in advance according to a timing advance (TA) value. When the propagation delay is large, the TA is also large. In the timing relationship of an NR system, a DL slot and a UL slot at base station side are also aligned. Therefore, by introducing an offset parameter, a transmission timing (also known as transmission timing relationship) in the NTN system can be determined with reference to a transmission timing in the NR system.

Figure 3:
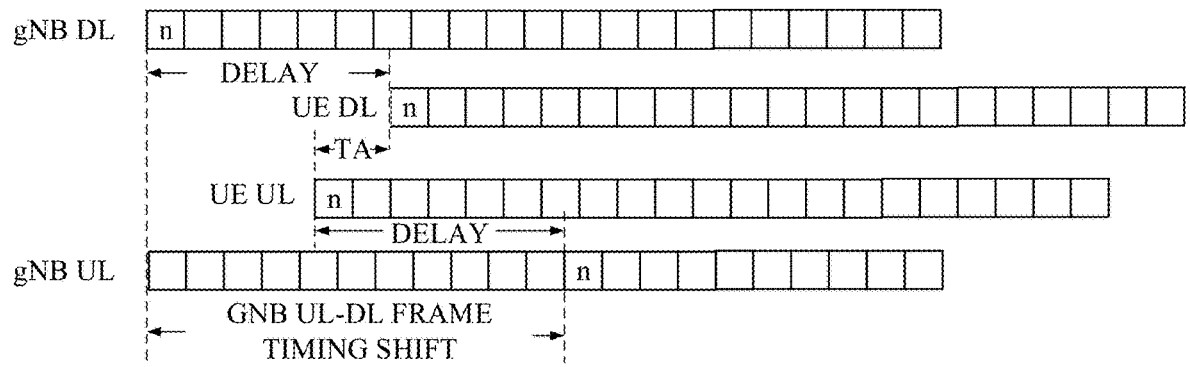
FIG. 3 is a schematic diagram of another timing relationship in an NTN system provided in embodiments of the disclosure.

Case 2: Referring to FIG. 3, there is an offset value, i.e., a timing shift (TS) between the gNB DL slot and the gNB UL slot at base station side.

In this case, to align the UL transmission of the UE at terminal side with the UL slot at base station side, the UE also needs to transmit in advance according to a TA value, where the TA value is small. However, in this case, the base station side needs to process a transmission scheduling timing in a complex scheduling manner.

In the NTN system or other communication systems with large propagation delay, an information transmission timing at terminal side and base station side can be enhanced by introducing an offset parameter. Exemplarily, the timing relationship in the NR system may include one or more of the following.

Reception timing of physical downlink shared channel (PDSCH): When the terminal device is scheduled to receive a PDSCH by a DCI, the DCI contains indication information of $K_0$, where $K_0$ is used to determine a slot for transmitting the PDSCH. For example, if the scheduling DCI is received in slot n, the slot allocated for PDSCH transmission is slot $$\left\lfloor n \cdot \frac{2^{\mu_{PDSCH}}}{2^{\mu_{PDCCH}}} \right\rfloor + K_0,$$

where $K_0$ is determined according to the subcarrier spacing of the PDSCH, $\mu_{PDSCH}$ is used to determine a subcarrier spacing configured for the PDSCH, and $\mu_{PDCCH}$ is used to determine a subcarrier spacing configured for a physical downlink control channel (PDCCH). The value of $K_0$ ranges from 0 to 32.

Transmission timing of DCI scheduled physical uplink shared channel (PUSCH): When the terminal device is scheduled to transmit a PUSCH by a DCI, the DCI contains indication information of $K_2$, where $K_2$ is used to determine a slot for transmitting the PUSCH. For example, if the scheduling DCI is received in slot n, the slot allocated for PUSCH transmission is slot $$\left\lfloor n \cdot \frac{2^{\mu_{PUSCH}}}{2^{\mu_{PDCCH}}} \right\rfloor + K_2,$$

where $K_2$ is determined according to the subcarrier spacing of the PDSCH, $\mu_{PUSCH}$ is used to determine a subcarrier spacing configured for the PUSCH, and $\mu_{PDCCH}$ is used to determine a subcarrier spacing configured for the PDCCH. The value of $K_2$ ranges from 0 to 32.

Transmission timing of random access response (RAR) grant scheduled PUSCH: For a slot for PUSCH transmission scheduled by a RAR grant, if the terminal device receives a PDSCH with a corresponding RAR grant message ending in slot n after the terminal device initiates physical random access channel (PRACH) transmission, the terminal device transmits the PUSCH in slot $n+K_2+\Delta$, where $K_2$ and $\Delta$ are specified in protocols.

Transmission timing of hybrid automatic repeat request-acknowledgement (HARQ-ACK) on physical uplink control channel (PUCCH): For a slot for PUCCH transmission, if PDSCH reception ends in slot n, or PDCCH reception indicating the release of a semi-persistent scheduling (SPS) PDSCH ends in slot n, the terminal device should transmit corresponding HARQ-ACK information on a PUCCH resource in slot $n+K_1$, where $K_1$ is the number of slots and is indicated by a PDSCH-to-HARQ-timing-indicator information field in a DCI format or provided by a dl-DataToUL-ACK parameter. $K_1=0$ corresponds to a slot overlap between the last slot of the PUCCH transmission and the PDSCH reception or the PDCCH reception indicating the release of the SPS PDSCH.

MAC CE activation timing: When HARQ-ACK information corresponding to a PDSCH carrying a MAC CE command is transmitted in slot n, a corresponding action and a UE assumption on a DL configuration indicated by the MAC CE command should be applied from the first slot after slot $n+3N_{slot}^{subframe,\mu}$, where $N_{slot}^{subframe,\mu}$ represents the number of slots per where subframe for subcarrier spacing configuration μ.

Transmission timing of channel state information (CSI) on PUSCH: The transmission timing of CSI on PUSCH is usually the same as the transmission timing of DCI scheduled PUSCH.

CSI reference resource timing: For a CSI report in UL slot n', a CSI reference resource is determined according to a single DL slot $$n - n_{CSI\_ref}, \text{ where } n = \left\lfloor n' \cdot \frac{2^{\mu_{DL}}}{2^{\mu_{UL}}} \right\rfloor,$$

$\mu_{DL}$ is a subcarrier spacing configuration for DL, and $\mu_{UL}$ is a subcarrier spacing configuration for UL. The value of $n_{CSI\_ref}$ depends on the type of the CSI report.

Transmission timing of aperiodic sounding reference signal (SRS): If the terminal device receives a DCI triggering transmission of an aperiodic SRS in slot n, the terminal device transmits the aperiodic SRS in each triggered SRS resource set in slot $$\left\lfloor n \cdot \frac{2^{\mu_{SRS}}}{2^{\mu_{PDCCH}}} \right\rfloor + k,$$

where k is configured by a higher layer parameter slotOffset in each triggered SRS resource set and determined according to the subcarrier spacing corresponding to the triggered SRS transmission, $\mu_{SRS}$ is a subcarrier spacing configuration for the triggered SRS transmission, and $\mu_{PDCCH}$ is a subcarrier spacing configuration for the PDCCH carrying a triggering command.

Optionally, in embodiments of the disclosure, the timing relationship in the communication system is enhanced using an offset parameter value $K_{offset}$, or in other words, the offset parameter value $K_{offset}$ is applied to the timing relationship, so that in various communication scenarios, the network device and the terminal device can communicate with each other in an accurate timing.

Exemplarily, the timing relationship may be enhanced using the offset parameter value $K_{offset}$ in one or more of the following manners.

Transmission timing of DCI scheduled PUSCH (including CSI on PUSCH): If the scheduling DCI is received in slot n, the slot allocated for PUSCH transmission is slot $$\left\lfloor n \cdot \frac{2^{\mu_{PUSCH}}}{2^{\mu_{PDCCH}}} \right\rfloor + K_2 + K_{offset}.$$

Transmission timing of RAR grant scheduled PUSCH: For the slot scheduled by the RAR grant for PUSCH transmission, the terminal device transmits the PUSCH in slot $n+K_2+\Delta+K_{offset}$.

Transmission timing of HARQ-ACK on PUCCH: For the slot for PUCCH transmission, the terminal device should transmit the corresponding HARQ-ACK information on a PUCCH resource in slot $n+K_1+K_{offset}$.

MAC CE activation timing: When the HARQ-ACK information corresponding to the PDSCH carrying the MAC CE command is transmitted in slot n, the corresponding action and the UE assumption on the DL configuration indicated by the MAC CE command should be applied from the first slot after slot $n+XN_{slot}^{subframe,\mu}+K_{offset}$, where X may be determined according to capabilities of the terminal device in the NTN, and X may have a value other than 3.

CSI reference resource timing: For the CSI report in UL slot n', the CSI reference resource is determined according to a single DL slot $n-n_{CSI\_ref}-K_{offset}$.

Transmission timing of aperiodic SRS: If the terminal device receives the DCI triggering transmission of the aperiodic SRS in slot n, the terminal device transmits the aperiodic SRS in each triggered SRS resource set in slot $$\left\lfloor n \cdot \frac{2^{\mu_{SRS}}}{2^{\mu_{PDCCH}}} \right\rfloor + k + K_{offset}.$$

It should be understood that, in above timing relationship, $K_{offset}$ may be the same or different in different situations, which is not limited herein.

In practical applications, the network device can notify the terminal device of the value of the offset parameter value $K_{offset}$, and the terminal device can receive and determine and then apply the offset parameter value $K_{offset}$ to the timing relationship. However, how the network device determines the value of $K_{offset}$, that is, how to determine the transmission timing is a technical problem to be solved in the disclosure and is for further study.

To solve the above technical problem, in the disclosure, the terminal device transmits indication information to the network device.

Figure 4:
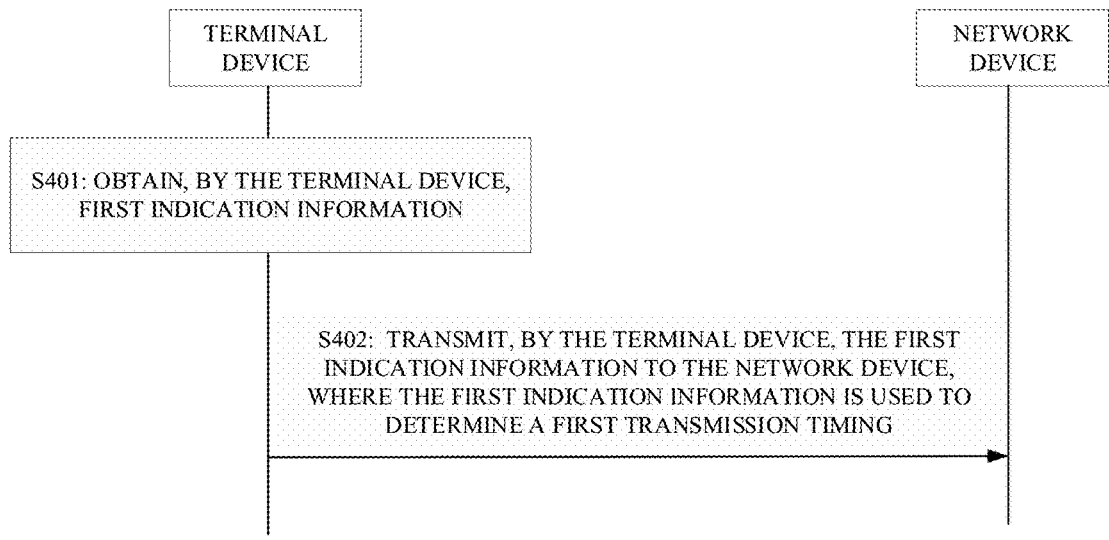
FIG. 4 is a schematic flowchart of a method for wireless communication 400 according to embodiments of the disclosure.

FIG. 4 is a schematic flowchart of a method for wireless communication 400 according to embodiments of the disclosure. The method 400 is applicable to the communication system 100 illustrated in FIGS. 1A and 1B. Specifically, as illustrated in FIG. 4, the method 400 may include the following.

S401: A terminal device obtains first indication information.

S402: The terminal device transmits the first indication information to a network device, where the first indication information is used to determine a first transmission timing.

Optionally, the first transmission timing includes at least one of: a transmission timing of DCI scheduled PUSCH, a transmission timing of RAR grant scheduled PUSCH, a transmission timing of HARQ-ACK on PUCCH, a MAC CE activation timing, a transmission timing of CSI on PUSCH, a CSI reference resource timing, and a transmission timing of aperiodic SRS.

It should be understood that, the disclosure is applicable to the following scenarios, but is not limited thereto.

For the terminal device, a TA value may be obtained in at least one of the following manners.

Manner 1: The terminal device determines the TA value according to first information indicated by the network device.

Optionally, the first information notified by the network device contains a TA value, where the TA value includes a common TA value configured by the network device for multiple terminal devices including the terminal device. That is, one common TA value may correspond to one cell, one beam direction, one reference signal such as a channel state information reference signal (CSI-RS) index, or one synchronization signal/physical broadcast channel block (SS/PBCH block or SSB) index.

In this case, the TA value determined by the terminal device according to the first information may be a TA value self-compensated by the terminal device with respect to the common TA value.

Optionally, the first information notified by the network device contains at least one of a satellite speed, an angle, a timing drift, and the like.

In this case, the TA value determined by the terminal device according to the first information may be a TA value actually compensated by the terminal device, that is, including the common TA value and the TA value self-compensated by the terminal device.

Manner 2: The terminal device determines the TA value according to second information obtained by itself, where the second information contains a TA value.

Optionally, the TA value contained in the second information is a TA value obtained by the terminal device according to known information such as positioning information.

In this case, the TA value determined by the terminal device according to the second information may be a TA value actually compensated by the terminal device, that is, including the TA value self-compensated by the terminal device.

Manner 3: The terminal device determines the TA value of the terminal device according to the first information notified by the network device and the second information obtained by the terminal device itself.

In this case, the TA value determined by the terminal device according to the first information and the second information may be a TA value actually compensated by the terminal device, that is, including the common TA value and the TA value self-compensated by the terminal device.

It should be understood that, if the offset parameter value $K_{offset}$ is a common value, for example, configured by the network device for each cell, each beam direction, each reference signal index, or each SSB index, then for any of the above manners, there is no need for the terminal device to notify the network device of the self-compensated TA value.

If the offset parameter value $K_{offset}$ is a UE-specific value, for manner 1, since the TA compensation by the terminal device is based on the first information indicated by the network device, the network device can determine the offset parameter value $K_{offset}$ of the terminal device by itself. For manners 2 and 3, since the terminal device obtains the second information by itself, in this case, when the network device determines the offset parameter value $K_{offset}$ for the terminal device, the terminal device needs to notify the network device of the self-compensated TA value, so that the network device is able to determine the offset parameter value $K_{offset}$ for the terminal device. Based on this, the terminal device needs to report the first indication information to the network device. In this case, the first indication information may indicate the offset parameter value $K_{offset}$, and the offset parameter value $K_{offset}$ is used to determine the first transmission timing.

It should be understood that, for a same terminal device, the value of $K_{offset}$ may be different in different cases. For example, the value of $K_{offset}$ corresponding to RAR grant scheduled PUSCH transmission may be a common value, and the value of $K_{offset}$ corresponding to PUSCH transmission scheduled by a UL grant in connected-state such as DCI format 0_1 may be a UE-specific value. For another example, the value of $K_{offset}$ corresponding to PUSCH transmission scheduled by DCI format 0_0 may be a common value, and the value of $K_{offset}$ corresponding to PUSCH transmission scheduled by DCI format 0_1 may be a UE-specific value.

It should be understood that, in other scenarios, for example, in a scenario where the terminal device determines to perform cell handover, beam switching, or transmission configuration indication (TCI) state switching according to DL measurement, the terminal device may also need to report the first indication information to the network device. In addition, the first indication information is not limited to be used to indicate the offset parameter value $K_{offset}$.

In a possible implementation, the first indication information being used to determine the first transmission timing includes: the first indication information indicating a first parameter value and the first parameter value being used to determine the first transmission timing, and/or the first indication information indicating a first parameter value range and the first parameter value range being used to determine the first transmission timing.

Optionally, the first parameter value includes at least one of: a TA value, a quantized value of the TA value, an offset parameter value $K_{offset}$, a TCI state, a beam direction, a reference signal identifier, and an SSB identifier.

Optionally, the first parameter value range includes at least one of: a TA value range corresponding to a TA value and/or a quantized value range of the TA value corresponding to a quantized value of the TA value.

Optionally, the first parameter value is preset, or configured by the network device through a higher layer parameter.

Optionally, the first parameter value range is preset, or configured by the network device through a higher layer parameter.

Optionally, the TA value includes at least one of: a self-compensated TA value of the terminal device, an actual-compensated TA value of the terminal device, a common TA value, for example, configured by the network device for multiple terminal devices including the terminal device, and a difference between the actual-compensated TA value of the terminal device and the common TA value.

Optionally, the first indication information indicates a first offset parameter value, such as a first $K_{offset}$, and the first offset parameter value is used to determine the first transmission timing.

Optionally, different TA values self-compensated by the terminal device correspond to different offset parameter values $K_{offset}$. Alternatively, different quantized TA values self-compensated by the terminal device correspond to different offset parameter values $K_{offset}$. Alternatively, different TCI states correspond to different offset parameter values $K_{offset}$. Alternatively, different beam directions correspond to different offset parameter values $K_{offset}$. Alternatively, different reference signal identifiers correspond to different offset parameter values $K_{offset}$. Alternatively, different SSB identifiers correspond to different offset parameter values $K_{offset}$. Alternatively, different TA ranges self-compensated by the terminal device correspond to different offset parameter values $K_{offset}$. Alternatively, different TA ranges corresponding to actual timing compensation by the terminal device correspond to the offset parameter value $K_{offset}$. Alternatively, different common TA ranges configured by the network device for multiple terminal devices including the terminal device correspond to the offset parameter value $K_{offset}$.

Optionally, the offset parameter value $K_{offset}$ is determined according to at least one of: a TA value, a TA value range, a quantized value of the TA value, a quantized value range of the TA value, a TCI state, a beam direction, a reference signal identifier, an SSB identifier, and a round trip time (RTT).

Optionally, the offset parameter value is determined according to a maximum RTT and/or a minimum RTT of a cell.

Optionally, the offset parameter value is determined according to a first subcarrier spacing. For example, for different subcarrier spacings, the offset parameter value may be different or may be the same.

Optionally, the first subcarrier spacing is preset, or configured by the network device.

Optionally, the TA value is determined according to a maximum TA value and/or a minimum TA value of the terminal device or a cell where the terminal device is located.

Exemplarily, assuming that the minimum integer number of milliseconds not less than the minimum TA value is 40 ms, then according to "40 ms", the network device can determine that the offset parameter value is 4 radio frames, 8 radio half frames, or 40 subframes.

Alternatively, if the subcarrier spacing is configured as $\mu=0$ (or 15 kHz), the offset parameter value is 40 slots, if the subcarrier spacing is configured as $\mu=1$ (or 30 kHz), the offset parameter value is 80 slots, if the subcarrier spacing is configured as $\mu=2$ (or 60 kHz), the offset parameter value is 160 slots, or if the subcarrier spacing is configured as $\mu=3$ (or 120 kHz), the offset parameter value is 320 slots.

For another example, assuming that the minimum integer number of milliseconds not less than the maximum TA value is 55 ms, then according to "55 ms", the network device can determine that the offset parameter value is 6 radio frames, 11 radio half frames, or 55 subframes.

Alternatively, if the subcarrier spacing is configured as $\mu=0$ (or 15 kHz), the offset parameter value is 55 slots, if the subcarrier spacing is configured as $\mu=1$ (or 30 kHz), the offset parameter value is 110 slots, if the subcarrier spacing is configured as $\mu=2$ (or 60 kHz), the offset parameter value is 220 slots, or if the subcarrier spacing is configured as $\mu=3$ (or 120 kHz), the offset parameter value is 440 slots.

Optionally, a unit of the offset parameter value includes at least one of slot, subframe, half frame, and radio frame.

Optionally, a unit of the offset parameter value includes microsecond or millisecond.

Optionally, the offset parameter value $K_{offset}$ is greater than or equal to the TA value.

Optionally, the first indication information indicates a first TA value or a quantized value of the first TA value, and the first TA value or the quantized value of the first TA value is used to determine the first transmission timing. Optionally, the first TA value is a TA value obtained by the terminal device.

Optionally, the TA value is determined according to at least one of: a TA value self-compensated by the terminal device, a TCI state, a beam direction, a reference signal identifier, an SSB identifier, and an RTT.

In another possible implementation, the first indication information being used to determine the first transmission timing includes at least one of: the first indication information not indicating a parameter value or a first parameter value and the parameter value being used to determine a transmission timing, the first indication information not indicating a parameter value range or a first parameter value range and the parameter value range being used to determine a transmission timing, the first indication information indicating that the terminal device does not report a parameter value used to determine the first transmission timing, the first indication information indicating that the terminal device does not report a parameter value range used to determine the first transmission timing, the first indication information indicating a first parameter value and the first parameter value corresponding to an invalid parameter value or the first parameter value being 0, and the first indication information indicating a first parameter value range and the first parameter value range corresponding to an invalid parameter value range.

Optionally, the content such as a parameter or the value of the parameter contained in the parameter value in the disclosure may be the same as the first parameter value, which will not be repeated below. Similarly, the content contained in the parameter value range in the disclosure may also be the same as the first parameter value range.

Optionally, the parameter value and the parameter value range in the disclosure may be configured in the same manner as the first parameter value and the first parameter value range, i.e., may be preset, or configured through a higher layer parameter, which will not be repeated below.

Optionally, after obtaining the first indication information, the network device determines according to the first indication information that the network device needs to determine the transmission timing according to its own information. For example, the network device determines the transmission timing according to at least one of: a TA value, a quantized value of the TA value, a TCI state, a beam direction, a reference signal identifier, an SSB identifier, and the like.

Optionally, when the first indication information indicates that the terminal device does not report a parameter value used to determine the first transmission timing, an index corresponding to the first indication information may be a minimum index or a maximum index among indexes corresponding to at least one parameter value. Assuming that there is a first mapping between at least one indication information (including the first indication information) and at least one parameter value, and the first mapping is in the form of a table, the index corresponding to the first indication information may be a line number corresponding to the first indication information.

Optionally, when the first indication information indicates that the terminal device does not report a parameter value range used to determine the first transmission timing, the index corresponding to the first indication information may be a minimum index or a maximum index among indexes corresponding to at least one parameter value range. Assuming that there is a first mapping between at least one indication information (including the first indication information) and at least one parameter value range, and the first mapping is in the form of a table, the index corresponding to the first indication information may be the line number corresponding to the first indication information.

In conclusion, the disclosure provides a method for wireless communication, where the terminal device transmits the first indication information to the network device, so that the network device can determine the transmission timing.

The following describes S401 in detail.

Implementation 1: S401 includes at least one of the following. The terminal device obtains the first indication information from at least one parameter value. The terminal device obtains a first parameter value from at least one parameter value, and obtains the first indication information according to the first parameter value. The terminal device obtains the first indication information from at least one parameter value range. The terminal device obtains a first parameter value range from at least one parameter value range, and obtains the first indication information according to the first parameter value range.

Implementation 2: S401 includes the following. The terminal device obtains the first indication information according to a first mapping, where the first mapping includes a correspondence between at least one indication information and at least one parameter value, and/or the first mapping includes a correspondence between at least one indication information and at least one parameter value range, and/or the first mapping includes a correspondence between at least one indication information and the terminal device not reporting a parameter value or a parameter value range used to determine the first transmission timing.

The following description is given with respect to Implementation 1.

Optionally, the terminal device obtains the first indication information from the at least one parameter value as follows.

Case 1: The first indication information is or indicates a parameter value among at least one parameter value. For example, the first indication information is at least one parameter value corresponding to at least one parameter among a TA, an offset parameter, a TCI state, a beam direction, a reference signal, an SSB, and the like.

Case 2: The terminal device obtains the first indication information according to a first mapping, where the first mapping includes a correspondence between at least one indication information and at least one parameter value.

For example, the first indication information indicates a quantized value of a first TA value, the quantized value of the first TA value is obtained by the terminal device and is used to determine the first transmission timing. By way of example rather than limitation, after determining a TA value $N_{TA}$, the terminal device determines the first indication information $T_A$ according to a formula $N_{TA}=T_A \cdot 16 \cdot 64/2^\mu$, where $\mu$ denotes a subcarrier spacing configuration, for example, $\mu=0$ represents a 15 kHz subcarrier spacing, $\mu=1$ represents a 30 kHz subcarrier spacing, etc., and a value range of the first indication information is $0, 1, 2, \ldots, N-1$, where N is a positive integer greater than or equal to 1. Optionally, a number of bits corresponding to the first indication information is determined according to $\lceil \log_2(N) \rceil$ where $\lceil \ \rceil$ represents ceiling.

For another example, Table 1 illustrates a correspondence, that is, a first mapping between at least one indication information and at least one reference signal identifier. It should be understood that, the first mapping may be preset, or configured by the network device.

TABLE 1

| Indication information | Reference signal identifier |
| --- | --- |
| 00 | 0 |
| 01 | 1 |
| 10 | 2 |
| 11 | 3 |

The terminal device may determine that the first indication information is "00" based on the first mapping and a reference signal identifier 0. The terminal device may determine that the first indication information is "01" based on the first mapping and a reference signal identifier 1. The terminal device may determine that the first indication information is "10" based on the first mapping and a reference signal identifier 2. The terminal device may determine that the first indication information is "11" based on the first mapping and a reference signal identifier 3. Optionally, the terminal device may, for example, select a reference signal having better channel quality according to a measurement result, and report a corresponding identifier of the reference signal having better channel quality to the network device through the first indication information.

For another example, Table 2 illustrates a correspondence, that is, a first mapping between at least one indication information, at least one $K_{offset}$, and at least one reference signal identifier. It should be understood that, the first mapping may be preset, or configured by the network device.

TABLE 2

| Indication information | $K_{offset}$ | Reference signal identifier |
| --- | --- | --- |
| 00 | $K_{offset}0$ | 0 |
| 01 | $K_{offset}1$ | 1 |
| 10 | $K_{offset}2$ | 2 |
| 11 | $K_{offset}3$ | 3 |

The terminal device may determine that the first indication information is "00" based on the first mapping, a reference signal identifier 0, and $K_{offset}0$. The terminal device may determine that the first indication information is "01" based on the first mapping, a reference signal identifier 1, and $K_{offset}1$. The terminal device may determine that the first indication information is "10" based on the first mapping, a reference signal identifier 2, and $K_{offset}2$. The terminal device may determine that the first indication information is "11" based on the first mapping, a reference signal identifier 3, and $K_{offset}3$. Optionally, the terminal device may, for example, select a reference signal having better channel quality according to a measurement result, determine a corresponding value of $K_{offset}$ according to Table 2, and report the corresponding value of $K_{offset}$ to the network device through the first indication information.

Optionally, the terminal device obtains the first parameter value from the at least one parameter value, and obtains the first indication information according to the first parameter value as follows.

Case 1: The terminal device obtains the first parameter value from the at least one parameter value, and the first indication information is or indicates the first parameter value. For example, the first indication information is at least one parameter value corresponding to at least one parameter among a TA, an offset parameter, a TCI state, a beam direction, a reference signal, an SSB, and the like.

Case 2: The terminal device obtains the first parameter value from the at least one parameter value, and obtains the first indication information according to a first mapping, where the first mapping includes a correspondence between at least one indication information and at least one parameter value.

For example, the first parameter value is the reference signal identifier 0 in Table 1, and the first indication information "00" is obtained according to the first mapping illustrated in Table 1.

Optionally, the terminal device obtains the first indication information from the at least one parameter value range as follows.

Case 1: The first indication information is or indicates a parameter value range among at least one parameter value range.

Case 2: The terminal device obtains the first indication information according to a first mapping, where the first mapping includes a correspondence between at least one indication information and at least one parameter value range.

For example, Table 3 illustrates a correspondence, that is, a first mapping between at least one indication information and at least one TA value range. It should be understood that, the first mapping may be preset, or configured by the network device.

TABLE 3

| Indication information | TA value range |
|---|---|
| 00 | TAx is less than or equal to TA0 |
| 01 | TAx is greater than TA0 and less than or equal to TA1 |
| 10 | TAx is greater than TA1 and less than or equal to TA2 |
| 11 | TAx is greater than TA2 |

Optionally, if TAx is less than or equal to TA0, it may mean that a parameter value range used to determine the first transmission timing is not reported.

The terminal device may determine that the first indication information is "00" based on the first mapping and TAx being less than or equal to TA0. The terminal device may determine that the first indication information is "01" based on the first mapping and TAx being greater than TA0 and less than or equal to TA1. The terminal device may determine that the first indication information is "10" based on the first mapping and TAx being greater than TA1 and less than or equal to TA2. The terminal device may determine that the first indication information is "11" based on the first mapping and TAx being greater than TA2.

It should be noted that, the terminal device may also obtain the first indication information according to a first mapping, where the first mapping includes a correspondence between at least one indication information, at least one parameter value, and at least one parameter value range.

For example, Table 4 illustrates a correspondence, that is, a first mapping between at least one indication information, at least one $K_{offset}$, and at least one TA value range. It should be understood that, the first mapping may be preset, or configured by the network device.

TABLE 4

| Indication information | $K_{offset}$ | TA value range |
|---|---|---|
| 00 | | not report a parameter value range used to determine the first transmission timing |
| 01 | $K_{offset}$ 0 | TAx is greater than TA0 and less than or equal to TA1 |
| 10 | $K_{offset}$ 1 | TAx is greater than TA1 and less than or equal to TA2 |
| 11 | $K_{offset}$ 2 | TAx is greater than TA2 |

The terminal device may determine that the first indication information is "01" based on the first mapping, TAx being greater than TA0 and less than or equal to TA1, and $K_{offset}$0. The terminal device may determine that the first indication information is "10" based on the first mapping, TAx being greater than TA1 and less than or equal to TA2, and $K_{offset}$1. The terminal device may determine that the first indication information is "11" based on the first mapping, TAx being greater than TA2, and $K_{offset}$2.

Optionally, the terminal device obtains the first parameter value range from the at least one parameter value range, and obtains the first indication information according to the first parameter value range as follows.

Case 1: The terminal device obtains the first parameter value range from the at least one parameter value range, and the first indication information is or indicates the first parameter value range, for example, a TA value range corresponding to a TA value and/or a quantized value range of the TA value corresponding to a quantized value of the TA value, etc.

Case 2: The terminal device obtains the first parameter value range from the at least one parameter value range, and obtains the first indication information according to a first mapping, where the first mapping includes a correspondence between at least one indication information and at least one parameter value range.

For example, the first parameter value range is that TAx is greater than TA0 and less than or equal to TA1 in Table 3, and the first indication information "01" is obtained according to the first mapping illustrated in Table 3.

The following description is given with respect to Implementation 2.

Implementation 2 can be performed independently from Implementation 1 of S401.

Exemplarily, as illustrated in Table 1, the terminal device may determine that the first indication information is "00" based on the first mapping and a reference signal identifier 0. The terminal device may determine that the first indication information is "01" based on the first mapping and a reference signal identifier 1. The terminal device may determine that the first indication information is "10" based on the first mapping and a reference signal identifier 2. The terminal device may determine that the first indication information is "11" based on the first mapping and a reference signal identifier 3.

Exemplarily, as illustrated in Table 3, the first mapping includes a correspondence between at least one indication information and at least one TA value range. The terminal device may determine that the first indication information is "00" based on the first mapping and TAx being less than or equal to TA0. The terminal device may determine that the first indication information is "01" based on the first mapping and TAx being greater than TA0 and less than or equal to TA1. The terminal device may determine that the first indication information is "10" based on the first mapping and TAx being greater than TA1 and less than or equal to TA2. The terminal device may determine that the first indication information is "11" based on the first mapping and TAx being greater than TA2.

Optionally, in the disclosure, the first mapping is preset, or configured by the network device through a first higher layer parameter.

Optionally, the first mapping includes N correspondences, N is a positive integer greater than or equal to 1, and at least one of the N correspondences includes a correspondence between one indication information and at least one parameter value, and/or at least one of the N correspondences includes a correspondence between one indication information and at least one parameter value range, and/or the N correspondences include a correspondence between at least one indication information and the terminal device not reporting a parameter value or a parameter value range used to determine the first transmission timing.

For example, there are four correspondences in Table 1, and each row may represent a correspondence between one indication information and one reference signal identifier. There are also four correspondences in Table 2, and each row may represent a correspondence between one indication information, one $K_{offset}$, and one reference signal identifier. There are also four correspondences in Table 3, and each row may represent a correspondence between one indication information and one TA value range. There are also four correspondences in Table 4, and each row may represent a correspondence between one indication information, one $K_{offset}$, and one TA value range.

Optionally, the number of bits corresponding to the first indication information is determined according to $\lceil \log_2(N) \rceil$, where $\lceil\ \rceil$ represents ceiling. For example, when N=6, the number of bits in the first indication information is $\lceil \log_2(6) \rceil = 3$ bits.

By way of example rather than limitation, the disclosure is described for example with reference to Table 4. The network device configures for the terminal device a first mapping, such as a first parameter value set through a first higher layer parameter. The first parameter value set includes four rows of parameter values, where a first row of parameter values indicates that the terminal device does not report an offset parameter value, and each row except the first row of parameter values includes a value of $K_{offset}$ and a TA value range.

Assume that TA indication information transmitted by the network device to the terminal device for the terminal device to perform timing compensation is $TA_{gNB}$, and/or TA information obtained by the terminal device itself for timing compensation is $TA_{UE}$, and/or TA information for the terminal device to actually perform timing compensation during UL transmission is $TA_{final}$.

In a possible embodiment, the TA value range includes a range corresponding to a TA value compensated by the terminal device, or in other words, the TA value range includes $TA_{final}$. For example, $TAx=TA_{final}$.

In a possible embodiment, the TA value range includes a range corresponding to a TA value self-compensated by the terminal device. For example, $TAx=TA_{final}-TA_{gNB}$, or $TAx=TA_{UE}$.

Correspondingly, if TAx is greater than TA0 and less than or equal to TA1, the terminal device determines the value of $K_{offset}$ to be $K_{offset}$ 0, therefore, the first indication information reported by the terminal device to the network device contains "01". Alternatively, if TAx is greater than TA1 and less than or equal to TA2, the terminal device determines the value of $K_{offset}$ to be $K_{offset}$ 1, therefore, the first indication information reported by the terminal device to the network device contains "10". Alternatively, if TAx is greater than TA2, the terminal device determines the value of $K_{offset}$ to be $K_{offset}$ 2, therefore, the first indication information reported by the terminal device to the network device contains "11". Alternatively, if the terminal device does not compensate the TA value by itself or TAx is less than or equal to TA0, the first indication information reported by the terminal device to the network device contains "00".

The following description is given for S402. S402 includes at least the following three implementations.

Implementation 1: The terminal device transmits the first indication information to the network device on a first UL resource, where the first UL resource is determined by the terminal device according to a second mapping, and the second mapping includes a correspondence between at least one indication information and at least one UL resource.

Implementation 2: The terminal device transmits uplink control information (UCI) to the network device, where the UCI contains the first indication information.

Implementation 3: The terminal device transmits an uplink shared channel (UL-SCH) to the network device, where the UL-SCH contains the first indication information.

The following description is given with respect to Implementation 1 of S402.

Optionally, the second mapping is preset, or configured by the network device through a third higher layer parameter.

Optionally, the first UL resource includes at least one of: a PRACH resource, an SRS resource, and a PUCCH resource.

Assuming that the first UL resource includes an SRS resource, taking a case illustrated in Table 5 as an example, if the terminal device determines that the first indication information reported to the network device contains "00", the terminal device selects a resource corresponding to SRS resource 0 to transmit an SRS to the network device. Alternatively, if the terminal device determines that the first indication information reported to the network device contains "01", the terminal device selects a resource corresponding to SRS resource 1 to transmit the SRS to the network device. Alternatively, if the terminal device determines that the first indication information reported to the network device contains "10", the terminal device selects a resource corresponding to SRS resource 2 to transmit the SRS to the network device. Alternatively, if the terminal device determines that the first indication information reported to the network device contains "11", the terminal device selects a resource corresponding to SRS resource 3 to transmit the SRS to the network device.

TABLE 5

| Indication information | $K_{offset}$ | TA value range |
|---|---|---|
| 00 | not report $K_{offset}$ | SRS resource 0 |
| 01 | $K_{offset}$ 0 | SRS resource 1 |
| 10 | $K_{offset}$ 1 | SRS resource 2 |
| 11 | $K_{offset}$ 2 | SRS resource 3 |

The following description is given with respect to Implementation 2 of S402.

Optionally, the UCI containing the first indication information is transmitted on at least one of: a periodic PUCCH, an aperiodic PUCCH, a dynamical scheduling PUSCH, and a configured grant (CG)-PUSCH, and an SPS PUSCH.

It should be noted that, the UCI may also be transmitted on another UL control channel or UL shared channel, which is not limited herein.

Optionally, the UCI further contains a CSI report. That is, the first indication information may be carried, together with CSI, in the UCI for reporting. For example, the network device configures the terminal device to periodically report the first indication information and the CSI, and the terminal device transmits the UCI containing the first indication information and the CSI on a same PUCCH resource.

It should be noted that, the first indication information may also be carried, together with other information in a PUCCH and a PUSCH, in the UCI for reporting, which is not limited herein. The first indication information may be carried and reported together with one or more kinds of other information.

The following description is given with respect to Implementation 3 of S402.

Optionally, the UL-SCH is transmitted on at least one of: a dynamical scheduling PUSCH, a CG-PUSCH, and an SPS PUSCH.

It should be noted that, the UL-SCH may also be transmitted on another PUSCH, which is not limited herein.

Optionally, the UL-SCH further contains a CSI report. That is, the first indication information may be carried, together with CSI, in the UL-SCH for reporting.

It should be noted that, the first indication information may also be carried, together with other information in the UL-SCH, in the UL-SCH for reporting, which is not limited herein. The first indication information may be carried and reported together with one or more kinds of other information.

Optionally, CSI request information triggering the CSI report is further used to trigger a report of the first indication information.

Optionally, the first indication information is a MAC CE.

In conclusion, in the disclosure, the terminal device may obtain the first indication information and transmit the first indication information to the network device, so that the network device can determine the transmission timing.

Optionally, the terminal device receives a second higher layer parameter transmitted by the network device, where the second higher layer parameter indicates that the terminal device reports the first indication information or whether the terminal device reports the first indication information. For example, the network device configures the terminal device whether to report the first indication information through the second higher layer parameter.

Optionally, if the terminal device has not received the second higher layer parameter transmitted by the network device, the terminal device does not report the first indication information. For example, if the network device needs the terminal device to report the first indication information, the network device configures the second higher layer parameter for the terminal device, otherwise, the network device does not configure the second higher layer parameter for the terminal device.

Optionally, the second higher layer parameter and the first higher layer parameter may be a same higher layer parameter, or may be different higher layer parameters.

It should be noted that, when the second higher layer parameter received by the terminal device indicates that the terminal device does not report the first indication information, the terminal device may skip S402.

Optionally, the terminal device receives a fourth higher layer parameter transmitted by the network device, where the fourth higher layer parameter indicates that the terminal device is allowed to perform timing compensation according to information obtained by itself or whether the terminal device is allowed to perform timing compensation according to information obtained by itself.

Optionally, if the terminal device has not received the fourth layer parameter transmitted by the network device, the terminal device cannot perform timing compensation according to information obtained by itself.

Optionally, the fourth higher layer parameter, the first higher layer parameter, and the second higher layer parameter may be a same higher layer parameter, or may be different higher layer parameters.

Optionally, the terminal device transmits second indication information to the network device, where the second indication information indicates whether the terminal device is able to perform timing compensation according to information obtained by itself, whether the terminal device has a positioning capability, or whether the terminal device is able to obtain synchronization from a global navigation satellite system (GNSS).

Optionally, the terminal device transmits third indication information to the network device, where the third indication information indicates that the terminal device does not report the first indication information.

Optionally, the terminal device transmits fourth indication information to the network device, where the fourth indication information indicates whether the terminal device performs timing compensation according to information obtained by itself, indicates that the terminal device performs timing compensation according to information obtained by itself, or indicates that the terminal device has not performed timing compensation according to information obtained by itself.

Optionally, the terminal device transmits to the network device a TA value obtained through timing compensation by the terminal device according to information obtained by itself.

Method embodiments of the disclosure are described in detail above with reference to FIG. 4, and apparatus embodiments of the disclosure are described in detail below with reference to FIGS. 5 to 9. It should be understood that, apparatus embodiments correspond to method embodiments, and similar descriptions may refer to method embodiments.

Figure 5:
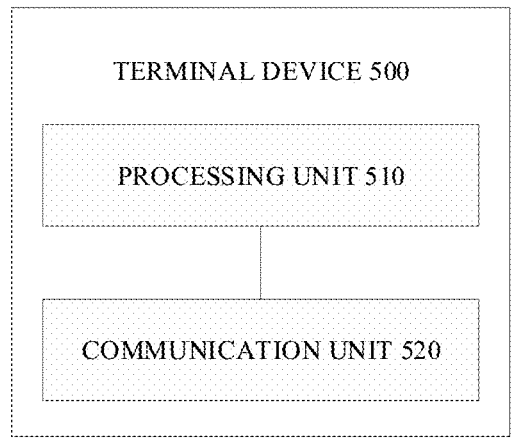
FIG. 5 illustrates a schematic block diagram of a terminal device 500 according to embodiments of the disclosure.

FIG. 5 illustrates a schematic block diagram of a terminal device 500 according to embodiments of the disclosure. As illustrated in FIG. 5, the terminal device 500 includes a processing unit 510 and a communication unit 520. The processing unit 510 is configured to obtain first indication information. The communication unit 520 is configured to transmit first indication information to a network device, where the first indication information is used to determine a first transmission timing.

Optionally, the first indication information being used to determine the first transmission timing includes: the first indication information indicating a first parameter value and the first parameter value being used to determine the first transmission timing, and/or the first indication information indicating a first parameter value range and the first parameter value range being used to determine the first transmission timing.

Optionally, the processing unit 510 is specifically configured to: obtain the first indication information from at least one parameter value, obtain a first parameter value from at least one parameter value, and obtain the first indication information according to the first parameter value, obtain the first indication information from at least one parameter value range, and obtain a first parameter value range from at least one parameter value range, and obtain the first indication information according to the first parameter value range.

Optionally, the first indication information being used to determine the first transmission timing includes at least one of: the first indication information not indicating a parameter value, and the parameter value being used to determine a transmission timing, the first indication information not indicating a parameter value range, and the parameter value range being used to determine a transmission timing, the first indication information indicating that the terminal device does not report a parameter value used to determine the first transmission timing, and the first indication information indicating that the terminal device does not report a parameter value range used to determine the first transmission timing.

Optionally, the processing unit 510 is specifically configured to: obtain the first indication information according to a first mapping, where the first mapping includes a correspondence between at least one indication information and at least one parameter value, and/or the first mapping includes a correspondence between at least one indication information and at least one parameter value range, and/or the first mapping includes a correspondence between at least one indication information and the terminal device not reporting a parameter value or a parameter value range used to determine the first transmission timing.

Optionally, the first mapping is preset, or configured by the network device through a first higher layer parameter.

Optionally, the first mapping includes N correspondences, N is a positive integer greater than or equal to 1, and at least one of the N correspondences includes a correspondence between one indication information and at least one parameter value, and/or at least one of the N correspondences includes a correspondence between one indication information and at least one parameter value range, and/or the N correspondences include a correspondence between at least one indication information and the terminal device not reporting a parameter value or a parameter value range used to determine the first transmission timing.

Optionally, a number of bits corresponding to the first indication information is determined according to $\lceil \log_2(N) \rceil$, and $\lceil \ \rceil$ represents ceiling.

Optionally, the communication unit 520 is further configured to receive a second higher layer parameter transmitted by the network device, where the second higher layer parameter indicates that the terminal device reports the first indication information or whether the terminal device reports the first indication information.

Optionally, the communication unit 520 is specifically configured to: transmit the first indication information to the network device on a first UL resource, where the first UL resource is determined by the terminal device according to a second mapping, and the second mapping includes a correspondence between at least one indication information and at least one UL resource.

Optionally, the second mapping is preset, or configured by the network device through a third higher layer parameter.

Optionally, the first UL resource includes at least one of: a PRACH resource, an SRS resource, and a PUCCH resource.

Optionally, the communication unit 520 is specifically configured to: transmit UCI to the network device, where the UCI contains the first indication information.

Optionally, the UCI is transmitted on at least one of: a periodic PUCCH, an aperiodic PUCCH, a dynamical scheduling PUSCH, a CG-PUSCH, and an SPS PUSCH.

Optionally, the UCI further contains a CSI report.

Optionally, the communication unit 520 is specifically configured to: transmit a UL-SCH to the network device, where the UL-SCH contains the first indication information.

Optionally, the UL-SCH is transmitted on at least one of: a dynamical scheduling PUSCH, a CG-PUSCH, and an SPS PUSCH.

Optionally, the UL-SCH further contains a CSI report.

Optionally, CSI request information triggering the CSI report is further used to trigger a report of the first indication information.

Optionally, the at least one parameter value includes at least one of: a TA value, a quantized value of the TA value, an offset parameter value, a TCI state, a beam direction, a reference signal identifier, and a synchronization signal (SS)/physical broadcast channel (PBCH) block (SSB) identifier, where the offset parameter value indicates the first transmission timing.

Optionally, the at least one parameter value range includes a TA value range corresponding to a TA value and/or a quantized value range of the TA value corresponding to a quantized value of the TA value.

Optionally, the TA value includes at least one of: a self-compensated TA value of the terminal device, an actual-compensated TA value of the terminal device, a common TA value configured by the network device for multiple terminal devices including the terminal device, and a difference between the actual-compensated TA value of the terminal device and the common TA value.

Optionally, an offset parameter value is determined according to at least one of: a TA value, a TA value range, a quantized value of the TA value, a quantized value range of the TA value, a TCI state, a beam direction, a reference signal identifier, and an SSB identifier.

Optionally, a unit of the offset parameter value includes at least one of slot, subframe, half frame, and radio frame.

Optionally, in some embodiments, the communication unit may be a communication interface or a transceiver, or an input/output (I/O) interface of a communication chip or a system-on-chip. The processing unit may be one or more processors.

It should be understood that, the terminal device 500 according to embodiments of the disclosure may correspond to the terminal device in method embodiments of the disclosure, and the above and other operations and/or functions of respective units in the terminal device 500 are respectively configured to implement corresponding procedures of the terminal device in the method 400 illustrated in FIG. 4, which will not be repeated herein for the sake of simplicity.

Figure 6:
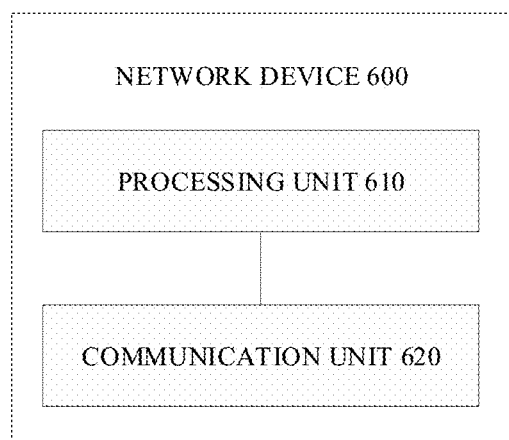
FIG. 6 illustrates a schematic block diagram of a network device 600 according to embodiments of the disclosure.

FIG. 6 illustrates a schematic block diagram of a network device 600 according to embodiments of the disclosure. As illustrated in FIG. 6, the network device 600 includes a communication unit 610. The communication unit 610 is configured to receive first indication information, where the first indication information is used to determine a first transmission timing.

Optionally, the first indication information being used to determine the first transmission timing includes: the first indication information indicating a first parameter value and the first parameter value being used to determine the first transmission timing, and/or the first indication information indicating a first parameter value range and the first parameter value range being used to determine the first transmission timing.

Optionally, the first indication information being used to determine the first transmission timing includes at least one of: the first indication information not indicating a parameter value and the parameter value being used to determine a transmission timing, the first indication information not indicating a parameter value range and the parameter value range being used to determine a transmission timing, the first indication information indicating that a terminal device does not report a parameter value used to determine the first transmission timing, and the first indication information indicating that the terminal device does not report a parameter value range used to determine the first transmission timing.

Optionally, the network device further includes a processing unit 620. The processing unit 620 is configured to determine the first transmission timing according to the first indication information and a first mapping. The first mapping includes a correspondence between at least one indication information and at least one parameter value, and/or the first mapping includes a correspondence between at least one indication information and at least one parameter value range, and/or the first mapping includes a correspondence between at least one indication information and a terminal device not reporting a parameter value or a parameter value range used to determine the first transmission timing.

Optionally, the network device further includes a communication unit 610. The communication unit 610 is configured to transmit the first mapping to the terminal device.

Optionally, the first mapping includes N correspondences, N is a positive integer greater than or equal to 1, and at least one of the N correspondences includes a correspondence between one indication information and at least one parameter value, and/or at least one of the N correspondences includes a correspondence between one indication information and at least one parameter value range, and/or the N correspondences include a correspondence between at least one indication information and the terminal device not reporting a parameter value or a parameter value range used to determine the first transmission timing.

Optionally, a number of bits corresponding to the first indication information is determined according to $\lceil \log_2(N) \rceil$, and $\lceil \ \rceil$ represents ceiling.

Optionally, the communication unit 610 is further configured to transmit a second higher layer parameter to a terminal device, where the second higher layer parameter indicates that the terminal device reports the first indication information or whether the terminal device reports the first indication information.

Optionally, the first indication information is transmitted on a first UL resource, where the first UL resource is determined by a terminal device according to a second mapping, and the second mapping includes a correspondence between at least one indication information and at least one UL resource.

Optionally, the second mapping is preset, or configured by the network device through a third higher layer parameter.

Optionally, the first UL resource includes at least one of: a PRACH resource, an SRS resource, and a PUCCH resource.

Optionally, the first indication information is transmitted through UCI, and the UCI contains the first indication information.

Optionally, the UCI is transmitted on at least one of: a periodic PUCCH, an aperiodic PUCCH, a dynamical scheduling PUSCH, a CG-PUSCH, and an SPS PUSCH.

Optionally, the UCI further contains a CSI report.

Optionally, the first indication information is transmitted on a UL-SCH, and the UL-SCH contains the first indication information.

Optionally, the UL-SCH is transmitted on at least one of: a dynamical scheduling PUSCH, a CG-PUSCH, and an SPS PUSCH.

Optionally, the UL-SCH further contains a CSI report.

Optionally, CSI request information triggering the CSI report is further used to trigger a report of the first indication information.

Optionally, in some embodiments, the communication unit may be a communication interface or a transceiver, or an I/O interface of a communication chip or a system-on-chip.

It should be understood that, the network device 600 according to embodiments of the disclosure may correspond to the network device in method embodiments of the disclosure, and the above and other operations and/or functions of respective units in the network device 600 are respectively configured to implement corresponding procedures of the network device in the method 400 illustrated in FIG. 4, which will not be repeated herein for the sake of simplicity.

Figure 7:
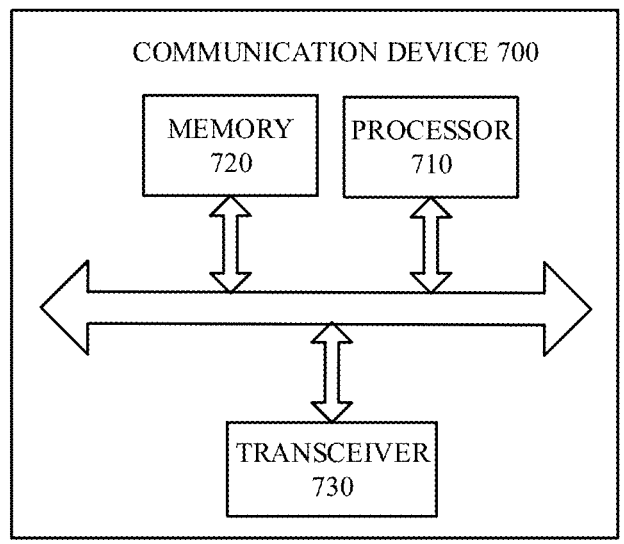
FIG. 7 is a schematic structural diagram of a communication device 700 provided in embodiments of the disclosure.

FIG. 7 is a schematic structural diagram of a communication device 700 provided in embodiments of the disclosure. As illustrated in FIG. 7, the communication device 700 includes a processor 710. The processor 710 can invoke and execute computer programs stored in a memory to perform the method provided in embodiments of the disclosure.

Optionally, as illustrated in FIG. 7, the communication device 700 can further include the memory 720. Specifically, the processor 710 can invoke and execute the computer programs stored in the memory 720 to perform the method provided in embodiments of the disclosure.

The memory 720 may be a separate device independent of the processor 710, or may be integrated into the processor 710.

Optionally, as illustrated in FIG. 7, the communication device 700 can further include a transceiver 730. The processor 710 can control the transceiver 730 to communicate with other devices, for example, to transmit information or data to other devices, or to receive information or data from other devices.

The transceiver 730 may include a transmitter and a receiver. The transceiver 730 may further include an antenna, where one or more antennas can be provided.

Optionally, the communication device 700 may be the network device of embodiments of the disclosure, and the communication device 700 can implement the operations performed by the network device described in the foregoing method embodiments of the disclosure, which will not be repeated herein for the sake of simplicity.

Optionally, the communication device 700 may be the terminal device of embodiments of the disclosure, and the communication device 700 can implement the operations performed by the terminal device described in the foregoing method embodiments of the disclosure, which will not be repeated herein for the sake of simplicity.

Figure 8:
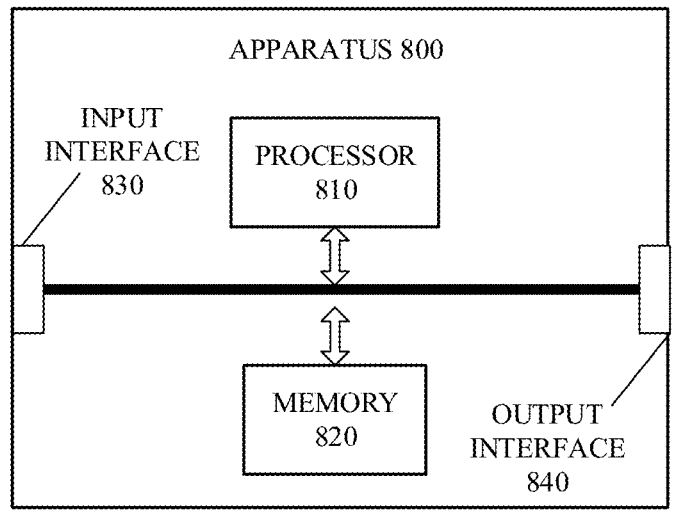
FIG. 8 is a schematic structural diagram of an apparatus according to embodiments of the disclosure.

FIG. 8 is a schematic structural diagram of an apparatus according to embodiments of the disclosure. As illustrated in FIG. 8, the apparatus 800 includes a processor 810. The processor 810 is configured to invoke and execute computer programs stored in a memory to perform the method provided in embodiments of the disclosure.

Optionally, as illustrated in FIG. 8, the apparatus 800 further includes a memory 820. The processor 810 can invoke and execute the computer programs stored in the memory 820 to perform the method provided in embodiments of the disclosure.

The memory 820 may be a separate device independent of the processor 810, or may be integrated into the processor 810.

Optionally, the apparatus 800 may further include an input interface 830. The processor 810 can control the input interface 830 to communicate with other devices or chips, for example, specifically, to acquire information or data transmitted by other devices or chips.

Optionally, the apparatus 800 may further include an output interface 840. The processor 810 can control the output interface 840 to communicate with other devices or chips, for example, specifically, to output information or data to other devices or chips.

Optionally, the apparatus is applicable to the network device of embodiments of the disclosure. The apparatus can implement the operations performed by the network device described in the foregoing method embodiments, which will not be repeated herein for the sake of simplicity.

Optionally, the apparatus is applicable to the terminal device of embodiments of the disclosure. The apparatus can implement the operations performed by the terminal device described in the foregoing method embodiments, which will not be repeated herein for the sake of simplicity.

Optionally, the apparatus mentioned in embodiments of the disclosure may also be a chip, for example, a system level chip, a system chip, a chip system, an on-chip system chip, etc.

Figure 9:
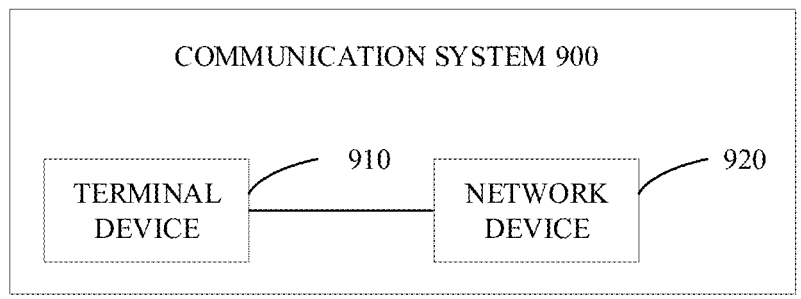
FIG. 9 is a schematic block diagram of a communication system 900 provided in embodiments of the disclosure.

FIG. 9 is a schematic block diagram of a communication system 900 provided in embodiments of the disclosure. As illustrated in FIG. 9, the communication system 900 includes a terminal device 910 and a network device 920.

The terminal device 910 may be configured to implement the corresponding function implemented by the terminal device in the above method, and the network device 920 may be configured to implement the corresponding function implemented by the network device or the base station in the above method, which will not be repeated herein for the sake of simplicity.

It should be understood that, the processor referred to herein may be an integrated circuit chip with signal processing capabilities. During embodiment, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or perform the methods, steps, and logic blocks disclosed in embodiments. The general purpose processor may be a microprocessor, or the processor may be any conventional processor or the like. The steps of the method disclosed in embodiments may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to embodiments of the disclosure may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or a flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link dynamic random access memory (synch-link DRAM, SLDRAM), and a direct rambus RAM (DR RAM). It should be noted that, the memory of systems and methods described herein is intended to include, but is not limited to, these and any other suitable types of memories.

It should be understood that, the above description of the memory is intended for illustration rather than limitation. For example, the memory of embodiments may also be an SRAM, a DRAM, an SDRAM, a DDR SDRAM, an ESDRAM, an SLDRAM, a DR RAM, etc. In other words, the memory of embodiments is intended to include, but is not limited to, these and any other suitable types of memory.

Embodiments of the disclosure further provide a computer-readable storage medium. The computer-readable storage medium is configured to store computer programs.

Optionally, the computer-readable storage medium is applicable to the network device or the base station of embodiments of the disclosure. The computer programs are operable with a computer to implement the operations performed by the network device or the base station described in the foregoing method embodiments, which will not be repeated herein for the sake of simplicity.

Optionally, the computer-readable storage medium is applicable to the mobile terminal/terminal device of embodiments of the disclosure. The computer programs are operable with a computer to implement the operations performed by the mobile terminal/terminal device described in the foregoing method embodiments, which will not be repeated herein for the sake of simplicity.

Embodiments of the disclosure further provide a computer program product. The computer program product includes computer program instructions.

Optionally, the computer program product is applicable to the network device or the base station of embodiments of the disclosure. The computer program instructions are operable with a computer to implement the operations performed by the network device or the base station described in the foregoing method embodiments, which will not be repeated herein for the sake of simplicity.

Optionally, the computer program product is applicable to the mobile terminal/terminal device of embodiments of the disclosure. The computer program instructions are operable with a computer to implement the operations performed by the mobile terminal/terminal device described in the foregoing method embodiments, which will not be repeated herein for the sake of simplicity.

Embodiments of the disclosure further provide a computer program.

Optionally, the computer program is applicable to the network device or the base station of embodiments of the disclosure. The computer program, when executed by a computer, is operable with the computer to implement the operations performed by the network device or the base station described in the foregoing method embodiments, which will not be repeated herein for the sake of simplicity.

Optionally, the computer program is applicable to the mobile terminal/terminal device of embodiments of the disclosure. The computer program, when executed by a computer, is operable with the computer to implement the operations performed by the mobile terminal/terminal device described in the foregoing method embodiments, which will not be repeated herein for the sake of simplicity.

Those of ordinary skill in the art will appreciate that units and algorithmic operations of various examples described in connection with embodiments herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method embodiments, which will not be repeated herein.

It will be appreciated that the systems, apparatuses, and methods disclosed in embodiments herein may also be implemented in various other manners. For example, the above apparatus embodiments are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in embodiments herein may be integrated into one processing unit or may be present as a number of physically separated units, and two or more units may be integrated into one.

If the integrated units are implemented as software functional units and sold or used as standalone products, they may be stored in a computer-readable storage medium. For such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various embodiments. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for wireless communication, comprising:
   receiving, by a terminal device, a higher layer parameter transmitted by a network device, wherein the higher layer parameter indicates to the terminal device to report a first indication information;
   obtaining, by the terminal device, an offset parameter value, wherein the offset parameter value is determined according to a timing advance (TA) value, and the offset parameter value indicates a first transmission timing;
   obtaining the first indication information according to the offset parameter value; and
   transmitting, by the terminal device, the first indication information to the network device;
   wherein the first indication information indicates the offset parameter value, and the offset parameter value is used to determine the first transmission timing; and
   wherein the first indication information is a media access control-control element (MAC CE).

2. The method of claim 1, wherein
   the first indication information indicates a first parameter value range, and the first parameter value range is used to determine the first transmission timing.

3. The method of claim 1, wherein transmitting, by the terminal device, the first indication information to the network device comprises:
   transmitting, by the terminal device, an uplink shared channel (UL-SCH) to the network device, wherein the UL-SCH contains the first indication information.

4. The method of claim 1, wherein the TA value comprises at least one of: a self-compensated TA value of the terminal device, an actual-compensated TA value of the terminal device, a common TA value configured by the network device for a plurality of terminal devices comprising the terminal device, and a difference between the actual-compensated TA value of the terminal device and the common TA value.

5. The method of claim 1, wherein the offset parameter value is determined according to at least one of: a TA value range, a quantized value of the TA value, a quantized value range of the TA value, a TCI state, a beam direction, a reference signal identifier, and an SSB identifier.

6. The method of claim 1, wherein a unit of the offset parameter value comprises at least one of slot, subframe, half frame, and radio frame.

7. A terminal device, comprising:
   a memory configured to store computer programs; and
   a processor configured to execute the computer programs stored in the memory to cause the terminal device to:
   receive a higher layer parameter transmitted by a network device, wherein the higher layer parameter indicates to the terminal device to report a first indication information;
   obtain an offset parameter value, wherein the offset parameter value is determined according to a timing advance (TA) value, and the offset parameter value indicates a first transmission timing;
   obtain the first indication information according to the offset parameter value; and
   transmit the first indication information to the network device;
   wherein the first indication information indicates the offset parameter value, and the offset parameter value is used to determine the first transmission timing; and
   wherein the first indication information is a media access control-control element (MAC CE).

8. The terminal device of claim 7, wherein
   the first indication information indicates a first parameter value range, and the first parameter value range is used to determine the first transmission timing.

9. The terminal device of claim 7, wherein the processor configured to cause the terminal device to transmit the first indication information to the network device is specifically configured to cause the terminal device:
   transmit an uplink shared channel (UL-SCH) to the network device, wherein the UL-SCH contains the first indication information.

10. The terminal device of claim 7, wherein the TA value comprises at least one of: a self-compensated TA value of the terminal device, an actual-compensated TA value of the terminal device, a common TA value configured by the network device for a plurality of terminal devices comprising the terminal device, and a difference between the actual-compensated TA value of the terminal device and the common TA value.

11. The terminal device of claim 7, wherein the offset parameter value is determined according to at least one of: a TA value range, a quantized value of the TA value, a quantized value range of the TA value, a TCI state, a beam direction, a reference signal identifier, and an SSB identifier.

12. The terminal device of claim 7, wherein a unit of the offset parameter value comprises at least one of slot, subframe, half frame, and radio frame.

13. A network device, comprising:
- a memory configured to store computer programs; and
- a processor configured to execute the computer programs stored in the memory to cause the network device to:
  - transmit a higher layer parameter to a terminal device, wherein the higher layer parameter indicates to the terminal device to report a first indication information;
  - receive first indication information
  - determine a first transmission timing according to the first indication information;
  - wherein the first indication information indicates an offset parameter value that is used to determine the first transmission timing;
  - wherein the first indication information is a media access control-control element, MAC CE; and
  - wherein the offset parameter value is determined according to a timing advance, TA, value, the offset parameter value indicates the first transmission timing, and the first indication information is obtained by the terminal device according to the offset parameter value.

14. The network device of claim 13, wherein the first indication information indicates a first parameter value range, and the first parameter value range is used to determine the first transmission timing.

* * * * *